Aug. 30, 1960  P. S. MOLONEY  2,950,756
SLIDING GLASS DOORS
Filed June 13, 1957  7 Sheets-Sheet 4

INVENTOR.
PAUL S. MOLONEY
BY Golrick & Golrick
ATTORNEYS

INVENTOR.
PAUL S. MOLONEY
BY
Golrick & Golrick
ATTORNEYS

INVENTOR.
PAUL S. MOLONEY
BY
Golrick & Golrick
ATTORNEYS

Aug. 30, 1960    P. S. MOLONEY    2,950,756
SLIDING GLASS DOORS
Filed June 13, 1957    7 Sheets-Sheet 7
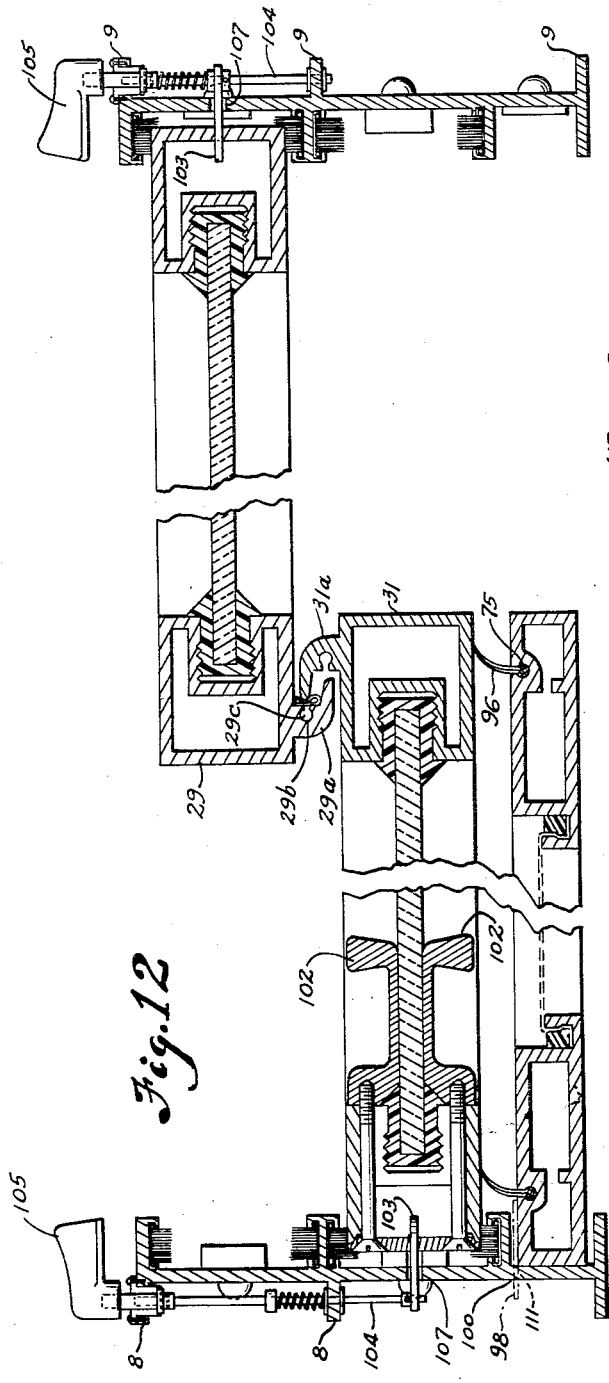
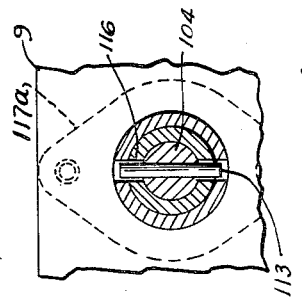
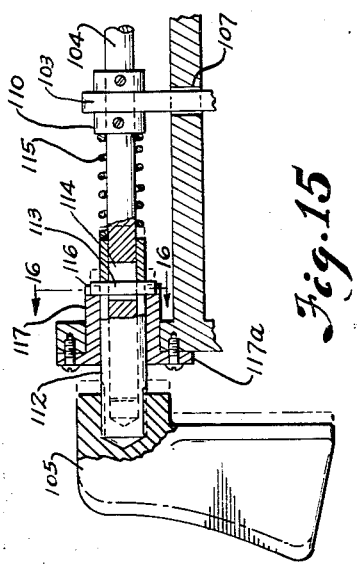
INVENTOR.
PAUL S. MOLONEY
BY
*Golrick & Golrick*
ATTORNEYS

United States Patent Office 2,950,756
Patented Aug. 30, 1960

2,950,756

SLIDING GLASS DOORS

Paul S. Moloney, 13901 Shaker Blvd., Cleveland, Ohio

Filed June 13, 1957, Ser. No. 665,410

5 Claims. (Cl. 160—91)

This invention is directed to improvements in weatherproof glass doors of the type wherein the doors are roller mounted.

The general object of the present invention is the provision of vertically adjustable sliding doors of the glass panel type and which are devised for ready installation of existing buildings wherein structural variations of the door openings exist.

Another object of the present invention is the provision of a sliding door panel incorporating a mortise joint between stiles and bottom rail combined with an adjustable roller mounting for vertically plumbing and door panels.

Another object of the present invention is the provision of a sliding door panel structure and door frame which can be efficiently weatherproofed.

A further object is the provision of a sliding door panel and frame structure which can be secured against tampering by prowlers.

A further object of the invention is the provision of a locking means incorporated in the unexposed part of the door frame structure.

A further object is the provision of roller mounted glass panel doors that are weather sealed relative to a door sill of a track formation presenting an unobstructed threshold surface.

A still further object is the provision of a unique mortise joint for stiles and top and bottom rails which will be economical to produce and result in a sturdy glass door panel and present a smooth appearance at the joints.

A still further object is the provision of a sliding door panel and frame structure which can be manufactured out of extruded aluminum sections and which fulfill the foregoing stated objects.

Other objects and purposes of the present invention will become apparent to those skilled in the art from the following description referring to the accompanying drawings showing an embodiment thereof. The essential characteristics are summarized in the claims.

In the drawings:

Fig. 12 is a horizontal sectional view of the structure shown in Fig. 8 and showing a locking means effective between panels and frame;

Fig. 13 is a cross sectional view of a latching means taken along the line 13—13 of Fig. 3;

Fig. 14 is a cross sectional view of a latching means for one panel as taken along the line 14—14 of Fig. 1;

Fig. 15 is a cross sectional view of a detent locking means;

Fig. 16 is a cross sectional view taken along the line 16—16 of Fig. 15;

The present invention contemplates the construction of sliding doors of the glass panel type which are constructed and insulated for all climates. The sashes and door frames are constructed of extruded aluminum sections rectilinear and channel shaped in cross section to afford sturdy mortise joints and firm carrier support to the glass plates which form the major area of the door panels. The panels are mounted on rollers riding on a triple track threshold and the panels include a screen door. The arrangement is such that while the panels are relatively slidable they are operatively arranged whereby they may be insect and weathersealed.

The entire construction is such that the panels may be run in production with precision in product and the roller mountings are adjustable to permit the installer to plumb the panels in a minimum of time. The construction is such that the casing or door frame or jamb may first be installed and the panels may then be set into position to ride on tracks formed on the sill of the door frame.

Figure 1:
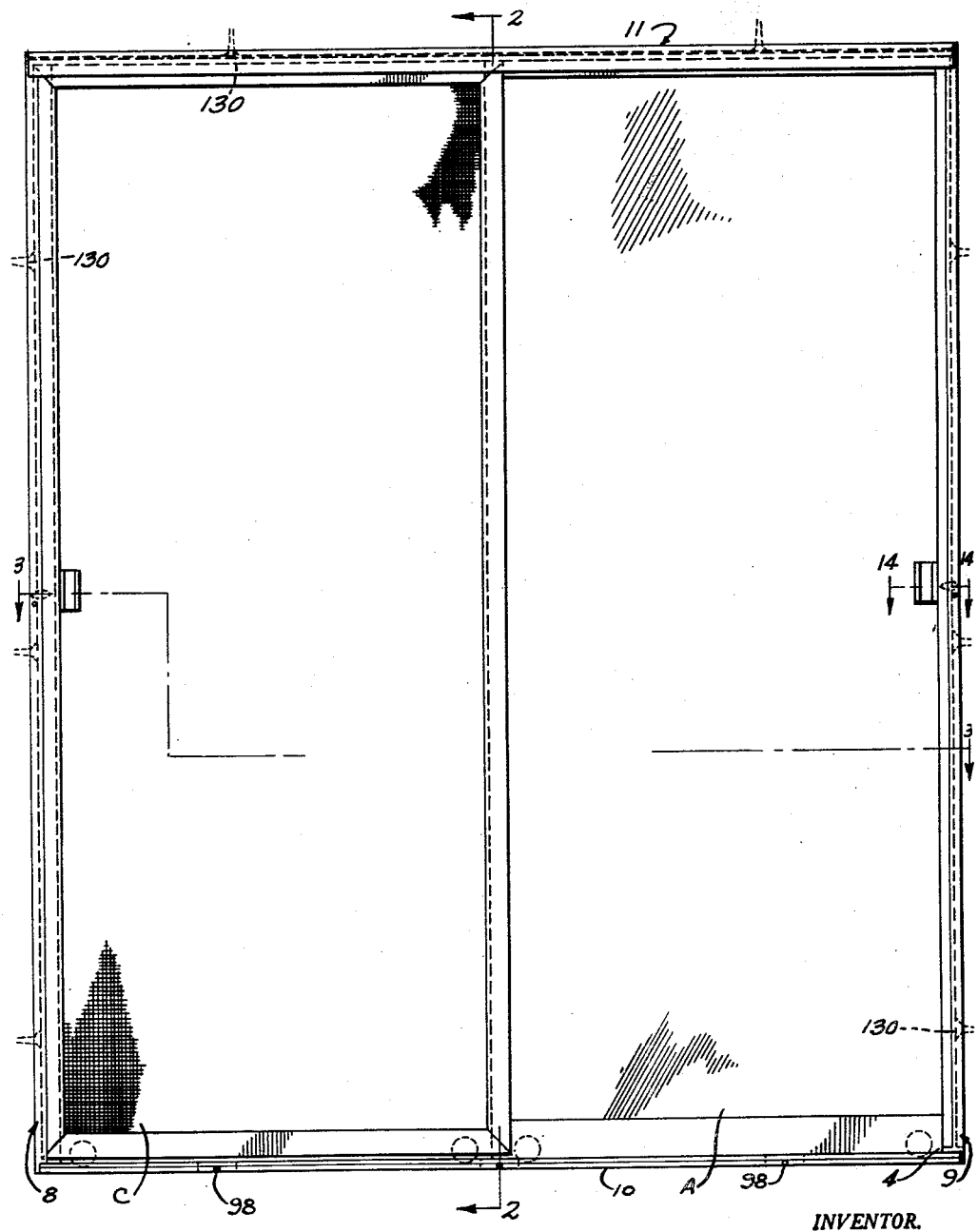
Fig. 1 is a front elevation of a panel door structure incorporating the invention as viewed externally.
Figure 3:
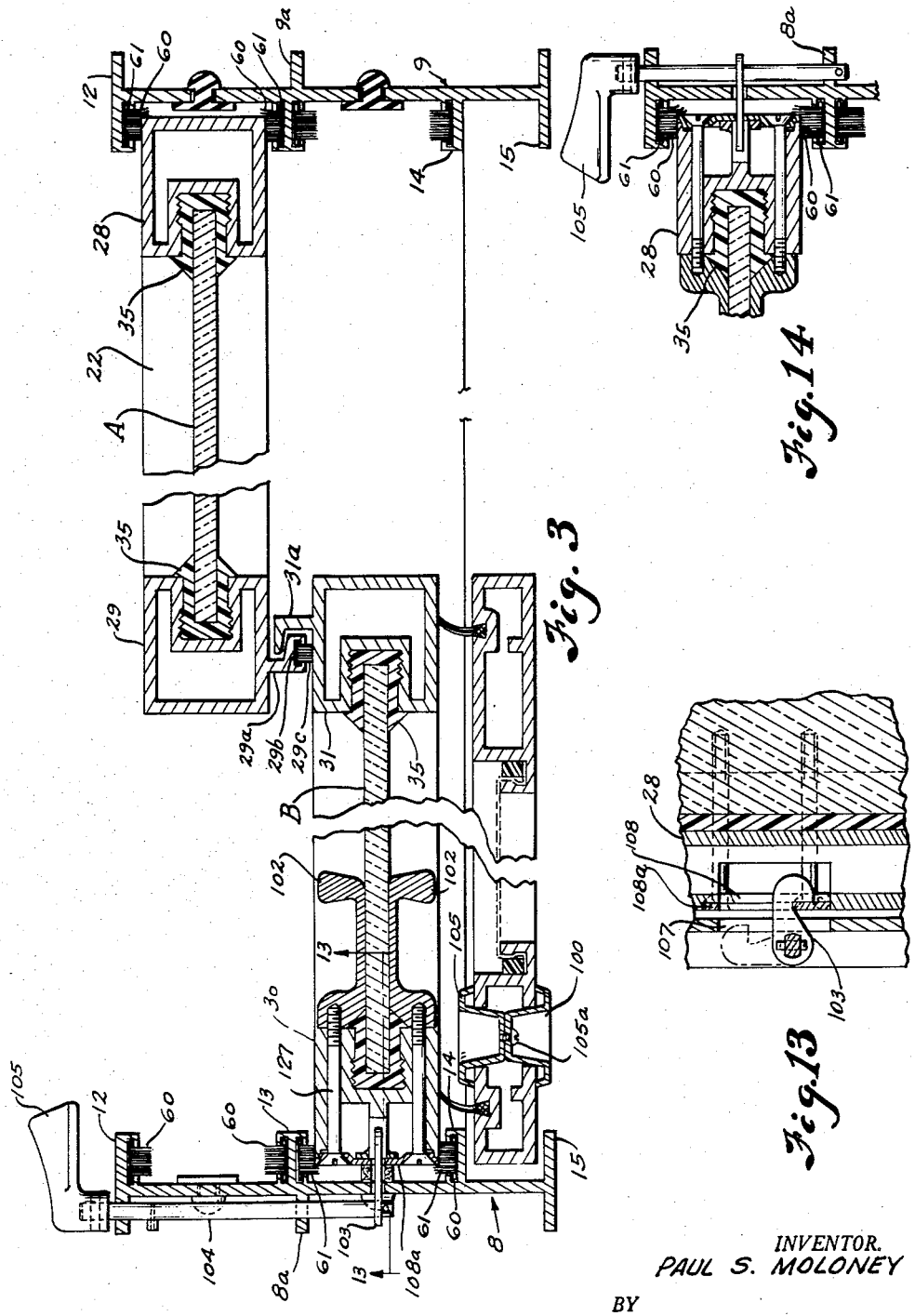
Fig. 3 is a horizontal cross section of the structure taken along the line 3—3 of Fig. 1.

In Fig. 1 of the drawings side jambs 8 and 9 of identical cross section as shown in Fig. 3 are mortise connected to the threshold or sill plate 10 and top jamb or head jamb 11. The jamb members are provided with longitudinally extending troughs in which the stiles of the door panels are disposed. The ends of the flanges 12, 13, 14 and 15 of the side jambs are square notched or cut away at the top and bottom to form a mortise joint with the top jamb 11 and with the sill plate and fasteners in the form of screw members 18 and 19 respectively securing the head and sill pieces to the side jambs in squared relation whereby the door frame structure can be handled as a unit in fitting and setting the same in an opening of the building wall. It will be noted that screw member 18 fits into the hollow extruded formation 20 formed on the top jamb member 11 and the screw may be a self-tapping screw while the screws 19 are engaged in the threaded opening 21 formed in the ends of the sill plate. It will be noted that the door frame structure shown provides a triple track way in which are disposed two glass door panels and a screen door panel A, B and C respectively and all panels are mounted on rollers tracked on the sill 10.

The glass door panel A comprises an extruded bottom rail 22 longitudinally open at the bottom; a top rail 24 longitudinally open at the top; and rectilinear vertical stile tubes 28 and 29 on one panel and 30 and 31 on the other panel. The top and bottom rails and the stiles have glass panel receiving grooves of sufficient depth and width to receive weather sealing means 35 of any suitable material such as a molded plastic to weatherseal the glass panels to the sash frames. The glass door panel B is of the same size and construction as the panel A.

Figure 7:
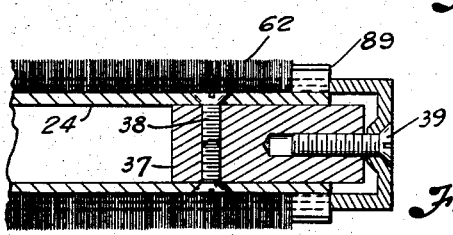
Fig. 7 is a horizontal section of the top mortise sash joint taken along the line 7—7 of Fig. 6.
Figure 6:
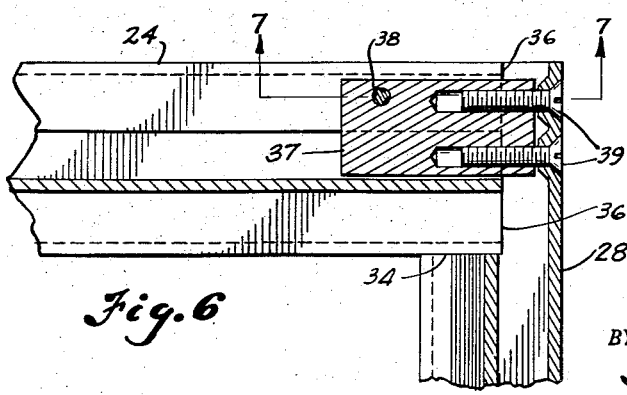
Fig. 6 is a vertical sectional view of the top mortise joints of the door panel stiles.

The stiles and rails of the panels A and B are connected by mortised joints as will now be described. The top mortise of the panel A is shown in cross section in Figs. 6 and 7. The top end of the stile 28 is square cut as indicated by the lines 34 and 36 to a depth equal to the height of the top rail 24. A mortising block 37 fits within the trough of the top rail 24 and is secured in the top rail by screw members 38 and so that the end of the block extends into the remainder of the channel part left at the stile notch. Screw members 39 extend through countersunk openings formed in the side edge of the stile and are threaded into the block 37. The countersunk openings for the screws 39 serve to accurately align the side surfaces of the top rail and the stile so that an aligned joint is presented.

The countersinks in the ends of the stiles for the taper headed screws 39 preferably are formed in a piercing die with proper fixture for assuring a central location and the mortising blocks 37 are closely fitted within the ends of the top rail whereby the end surfaces of stiles and rails 24 will be in a smooth common plane at the mortise joints. It will be noted that the mortising blocks 37 protrude beyond the ends of the top rail whereby a channel shape of the top ends of the stiles is obtained for strength.

Figure 4:
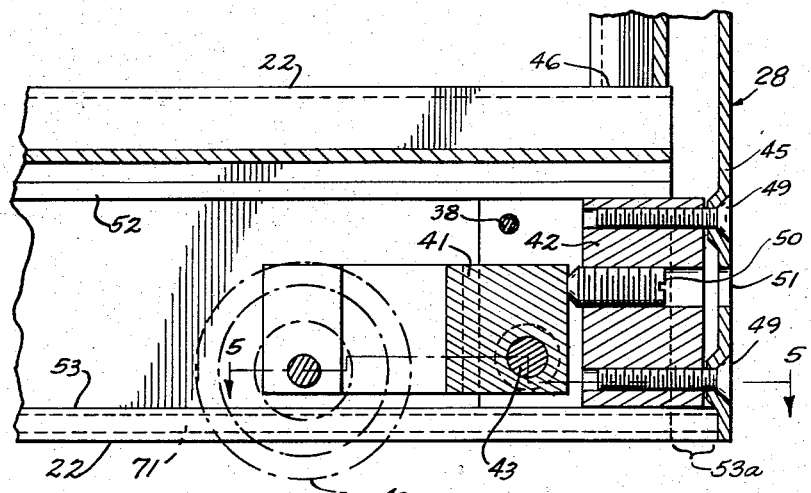
Fig. 4 is a centrally taken vertical cross section of the glass door panel stile and bottom rail mortise joint.
Figure 5:
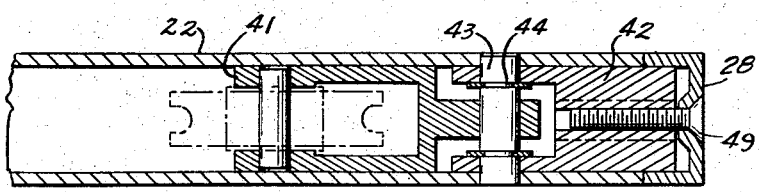
Fig. 5 is a cross sectional view of the joint taken along the planes indicated by the line 5—5 of Fig. 4.

The mortise joints between the stiles and bottom rails of the door panels are substantially the same as those described for the top rails 24 except that the lower mortise blocks are arranged to constitute a support for a pivotal mounting for a roller carrying hinge 41 as shown in Figs. 4 and 5. The rollers 40 are mounted on a bifurcated hinge member 41 of a width to slidably fit the upper surfaces of the walls of the bottom rails 22. Thus the lower mortise blocks 42 support a hinge pin 43 which extends through the rail walls and the hinge 41 and is held in place by spring washers 44 snapped into grooves formed in the pin 43. This pin may be a press fit to secure the blocks to the rails or if desired a tapered pin 38 may extend through the block and rail walls.

The lower ends of the stiles 28, 29, 30 and 31 are square notched, note line 46 in Figs. 4 and 5, leaving channel shaped stile ends 45 which are secured to the mortise blocks 42 by countersunk taper headed screw members 49. The blocks 42 carry adjusting screws 50 in alignment with openings 51 formed in the stile walls and which abut the upper part of the roller hinge 41 whereby the door panels may be plumbed to the vertical while riding on the sill. In Fig. 4 the bottom end of the stile terminates above a projecting portion 53a of the bottom rail, the rail projecting portion carrying weather-sealing means to the bottom corners of the panels as will be explained.

The mortising blocks 42 are fitted between internal shoulders 52 and 53 extending longitudinally in the interior of the vertical walls of the bottom rails 22.

Figure 2:
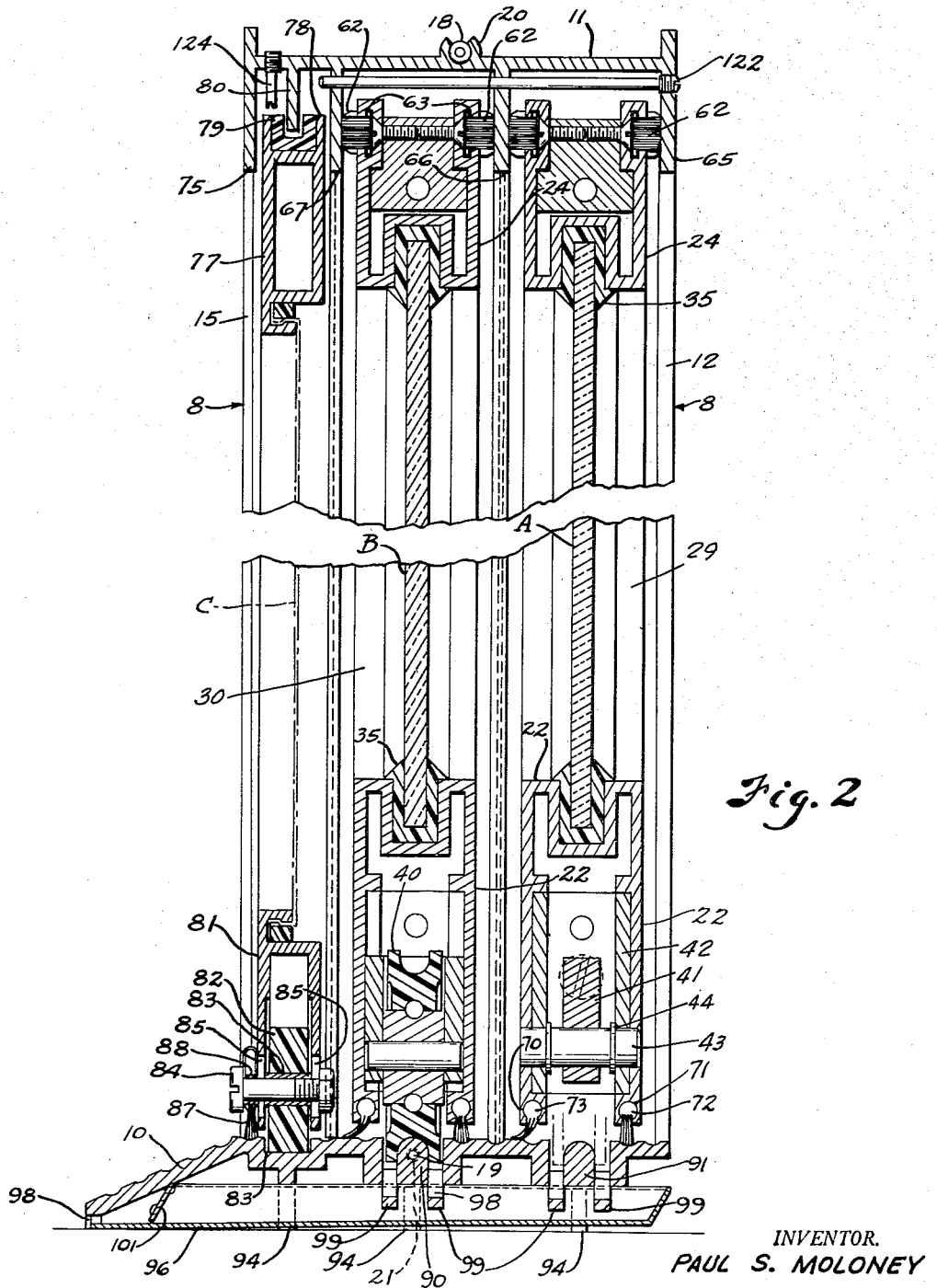
Fig. 2 is a vertical cross section of the structure taken substantially along the line 2—2 of Fig. 1.

It will be noted in Figs. 2 and 3 that the door panels are mounted on the frame and sill to have a substantial space therebetween to afford space for the mounting of weather stripping carried by the door frame side jamb 8 and 9 and top piece or jamb or rail 11. This arrangement necessitates the use of vertical weather stripping between the centrally disposed stiles 29 and 31 of the door panels A and B. To this end interlocking channels 29a and 31a are formed on stiles 29 and 31 to overlap and engage when the door panels are in closed position. One of the stile channel structures 29a, has a bottom groove 29b with a weather stripping 29c secured therein to abut the vertical face of the stile channel structure 31a when the door panels approach closing position.

Figure 18:
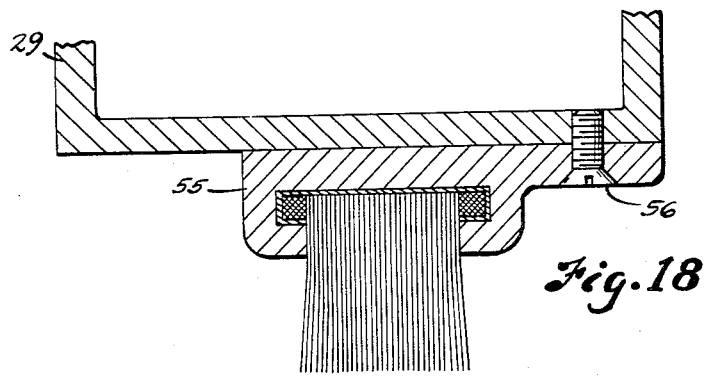
Fig. 18 is an enlarged section of an insert member comprising part of the weather stripping of the interlocking panel stiles.
Figure 19:
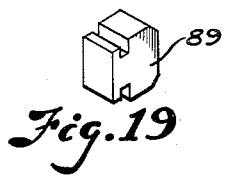
Fig. 19 is a perspective view of a dovetailed slide block for protecting the top rail piling fibers of the door panels.
Figure 9:
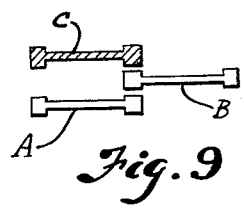
Figs. 9, 10 and 11 are diagrammatic representations of the adaptability of the structure to two, three and four panel installations.

At the top of stiles 29 and 31 two or three inches of the channel formation 29a and 31a are cut away during manufacture of the panel to facilitate the mounting of the door panels within the head rail 11 of the door frame and separate channeled members 55, one of them carrying weather sealing 56, are fastened with screws to extend the sealing 56 upwardly in vertical alignment with the seal 29c to the top end of the inner face of the stile. One of the insert pieces 55 is shown in Fig. 18 flanged at one side for screws 56 to extend into the stile 29.

Weather sealing in the form of pile strips 60 is carried in channel formation 61 formed in the rail flanges 12, 13 and 14 of the side frame members to extend the height of the door panels A and B. Weather stripping 62 is likewise carried along the tops of the door panel rails 24 to engage the depending flanges 65, 66 and 67 of the top door frame member. To prevent the piling 62 along the top of the door panels from becoming flattened buttons of unyielding plastic stoppers 89 are set in the top rail grooves holding the piling. These stoppers are of less height than the height of the piling and protect the piling fibres from becoming bent to a permanently flattened condition should the door panel become tilted toward one side. The use of the inserts 55 affords the minimum of spacing between the door frame flanges 12, 13 and 14 and 65, 66 and 67 and no weather opening is present at the tops of the door panels.

The threshold or sill structure is such as to track support the rollers of the two door panels A and B and a screen door panel C and the weather sealing of the two door panels A and B is accomplished in the following manner. The bottom margins of the panels have circular, longitudinally extending grooves 70 and 71, the inner grooves 71 carry a piling strip 72 which wipes upon the sill 10 and the outer groove 70 carries a flexible weather strip 73 deflected outwardly and upwardly by contact with the sill surface. It has been found that piling will not stop driving rain impinging on the sill and a plastic weather strip such as 73, deflected outwardly, will stop the driving rain. It will be noted that by having the mortise joints at the bottom corners of the panels A and B so constructed as to permit the extension of the grooves 70 and 71 by the extensions 52 outwardly to the corner edge, the weather stripping can be firmly carried into the corners of the door frame.

The door screen panel is removably mounted in the door frame between flanges 67 and 75 and 14 and 15. The stiles and top and bottom rail may be formed of extruded rectangular tubing. The top rail 77 of the screen panel C is channel shaped to receive bearing blocks 79 pressed into place. These blocks are formed preferably of nylon and are centrally slotted to slide along a depending flange 80 formed in the door frame head piece 11. The bottom rail 81 of the screen door panel is open longitudinally at the bottom to receive nylon rollers 82 riding in a depressed tract 83 formed in the door sill. The rollers 82 are adjustably mounted on a spacer sleeve 83 and the sleeve is clamped in place by a bolt 84 extending through vertical slots 85 formed in the walls of the door rail 81. An insect barrier in the form of piling strip 87 extends along the lower outer marginal edge of the screen door and wipes upon the surface of the sill. A short sleeve 88 on the bolt 84 prevents the bolt from crushing the piling strip when the sleeve 83 is clamped in vertically adjusted position by the bolt between the walls of the rail 81.

Figure 10:
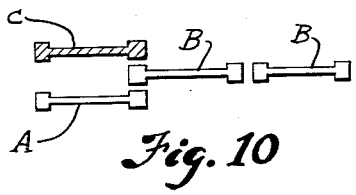

The threshold or sill 10 as will be seen in Figs. 2 and 10 comprises a one piece extrusion having depressed tracks 90 and 91 upon which the grooved rollers 40 ride. The sill thus presents an overall flat surface in the threshold and the sides of the tracks 90 and 91 are sufficiently depressed below the flanges of the grooved rollers to form drainage gutters.

The sill structure 10 is provided with longitudinally extending load supporting flanges 94 which determine the depth of the sill structure and the outer or weather side 95 of the sill is stooped or sloped downwardly.

The tracks of the sill are provided with a drainage arrangement comprising appropriately spaced trough structures 96 fitted in notches cut in the sill flanges 94 and disposed to transversely underlie the tracks and drain outwardly. Openings 98 are formed in the outer or stoop end of the sill. Communication between the tracks and troughs is established by depressed sheared portions 99 of the bottom walls of the track formations at the locus of the troughs. The troughs are provided with louvers 101 to prevent drafts and driven rain from passing inwardly through the drain passages 98 while permitting drainage to pass thereunder.

If desired the rollers 40 on door panels A and B may be mounted on ball bearings.

Inner and outer handle members 102 may be formed by extruded pieces to be attached to a stile of the panel B as shown in Fig. 3 with screw members 127 extending through the stile to secure the handles to the inner edge or face of the stile with the major portion of the opposed faces of the handles in contact with the glass pane of the door panel. The screen door panel (note Fig. 3) may have an opening formed in one of the stiles thereof for the reception of thimbles 100 to provide finger openings. These thimble members may be press fitted in the stile opening or may be held in place by a bolt or screw 105a.

When shipping the door frame members 8, 9, 10 and 11 are in unassembled condition but the three panel members are complete. After the door frame is installed and plumbed by shimming or otherwise the frame is secured in place by screw members 130 passing through the bottoms of the ways of the members 8, 9 and 11. The tops of the panels A, B and C may then be inserted in the ways between the flanges 65, 66, 67 and 70 by tilting the panels from the vertical and shifting them upwardly into position whereupon the panel-rollers may then be set in vertical position on the respective tracks of the door sill whereby the entire weight of the panels is upon the door sill tracks. If necessary, the panels may then be adjusted vertically by adjusting the screw members 50 and bolt 84 thereby to bring the weather stripping 72, 73 and 87 in proper wiping relation to the sill surfaces. The pile carrying insert 55 may then be attached to the panel stile thereby to extend the weather stripping 29c to the top of the door panels A and B.

Figure 11:
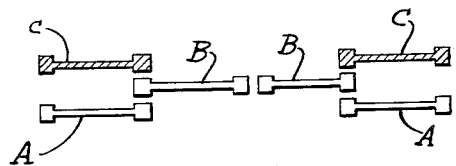

Figs. 10, 11 and 12 show diagrammatically three different installations of the door panels. Fig. 11 shows an installation in conformity with the structure hereinbefore described with reference to Figs. 1 to 9.

Fig. 11 shows a three panel installation and Fig. 12 shows a four panel installation. Other than a change in length of the sill and top jamb or rail of the door frame the structures are the same as those described. These illustrations show the versatility of the described structures for standardized production.

Figure 8:
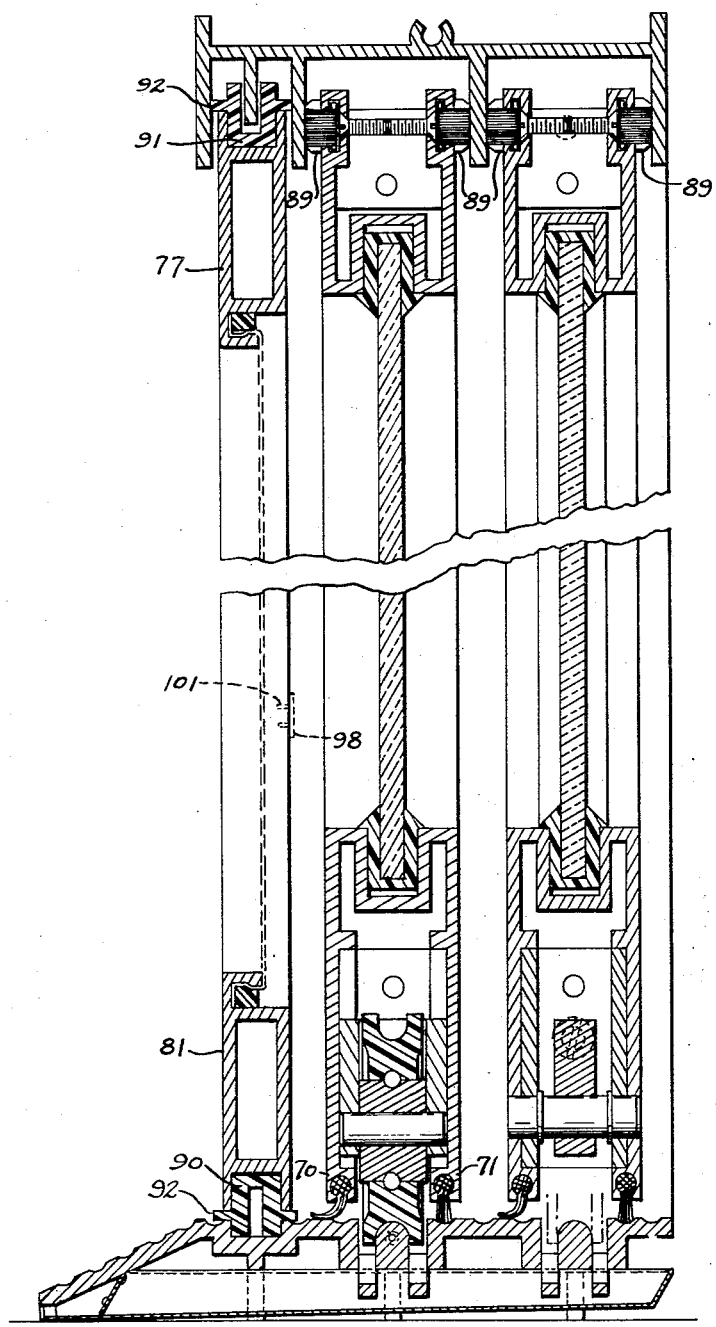
Fig. 8 is a vertical section similar to Fig. 2 but incorporating a modified form of screen panel mounting.

In some installations it is desirable to have the screen door panel non-movable after installation and by sliding panel B to open position thus provide a screened doorway opening. In this event the roller mountings are omitted on the screen panel and the top and bottom groove rails have fitted therein plastic shouldered strips 90 and 91. These strips extend the full width of the screen door panel and are provided with shoulders 92 which serve the dual purpose of insect sealing by bottom engagement with the sill surface and insect sealing with the flanges of the door frame top rail as shown in Fig. 8. A vinyl plastic is preferred which is sufficiently yieldable to permit insertion of the screen panel in the frame and sill. One stile of the screen frame is provided with a vertically extending groove formation 95 to receive the cylindrical anchoring end of a plastic insect sealing strip 96 which is in wiping engagement with the stile faces of the glass door panel B. The end face of the other stile of the screen panel is set in intimate contact with the door jamb surface and the bumper buttons are omitted for this purpose. It will be noted that the grip flanges 102 on the handle are limited in projection so as not to extend beyond the plane of the stile faces of the door panel B so that the panel B may traverse the insect stopper 96.

The means for locking the non-slidable screen panel shown in Figs. 8 and 12 may comprise a stainless steel plate 98 having a latching hook 99 extending through a slot 100 formed in the door jamb wall. The latching plate is attached to the inner stile face of the screen door by screws 101 after the screen door has been set in place and is of such shape relative to the slot that the screen panel cannot be lifted out of its sill slot. When the screen door panel is to be removed the plate has to be removed. Thus the top, bottom and sides of the screen door panel are insect sealed and the panel is locked in place.

The locking of the panel B is effected by a rockable dog latch 103 mounted upon a rocker shaft 104. The rocker shaft is bearing supported by the unexposed back flanges 8a or 9a and a flange 12 of the door jamb structure and is rocked by a lever member 105 disposed at the room face of the door jamb. The latch 103 is swung by the shaft through a slot or opening 107 formed in the walls of the door jambs; see Figs. 13 and 14. There are separate locking means for each of the panels A and B. The stiles 28 and 30 of the panel structures have slots 108 formed in the stile end faces with ledge plates 108a spanning the slots and which are engaged by the dog latches 103 when the shafts 104 are rocked by the manual levers 105. The locking ledge may comprise a stainless steel plate inset 108a fixed to the stile end and spanning the slots.

To lock the rolling screen panel of Figs. 2 and 3 the shaft 104 may be extended to carry a rocking dog 110 which swings through the jamb slot 111 when the dog latch 103 is rocked to an unlocking position, i.e. the effective latching hooks of the two latching dogs are operatively disposed at least 90° apart so that the rolling screen door is locked when the door panel B is unlocked and the screen door is unlocked when the door panel is locked.

Figure 17:
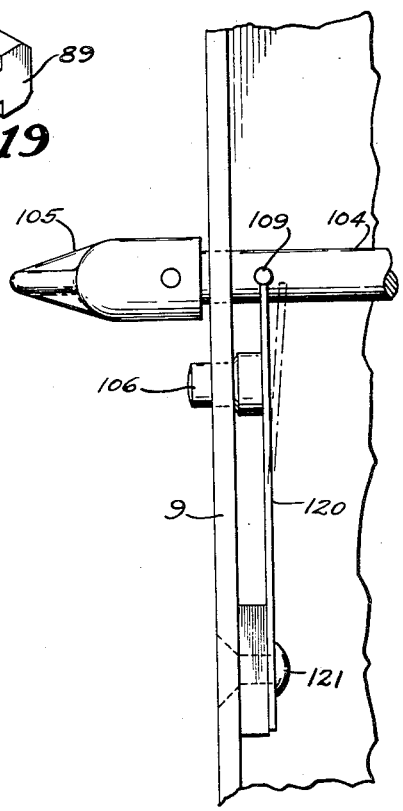
Fig. 17 is a detailed view of one form of locking means.

A simple form of lock for the panels A and B is shown in Figs. 3 and 17. A flat spring 120 is secured upon flange 9 of the jamb and bears against a pin 109 carried by the rocker shaft to maintain the shaft in locked position by contact with pin 109. A button 106 on the flat spring 120 extends through an opening in the jamb flange 9 so that by depressing the button the end of the spring is released from the rocking path of the pin 109 and the handle can be turned.

In Figs. 15 and 16 another form of lock is shown comprising a manual handle 105 having a detent barrel 112 slidable on the rocker shaft 104 and is connected to the shaft by a slot and pin connection 113—114. A helical spring 115 on the shaft abuts a shoulder washer 110 on the shaft and the inner end of the handle barrel 112. A latching slot 116 is formed on a sleeve 117 constituting a bearing for the barrel 112 and the sleeve is provided with a flange 117a secured to the flange 8 of the door jamb. To unlock the door or screen panel the handle 105 is depressed to free a detent pin 113 from the slot in the inner end of the fixed sleeve 117. The shaft may then be rocked to swing the dog latch 103 to unlocking position. In locking the panel the pin rides on the end face of the sleeve 117 until the pin again is snapped into the slot in the end of member 117. Also the locking means disclosed is effective regardless of the roller adjustments of the panels A, B and C. Since all of the locking mechanisms are concealed behind the walls of the door jambs the locking means is inaccessible to prowlers.

To further make the panels tamper proof pins 122 are inserted in the head rail of the door jamb structure to extend from the indoor side of the frame outwardly through the jamb flanges 65, 66 and 67 as shown in Fig. 2. These pins serve to prevent the lifting of the panels out of the frame and are so positioned and dimensioned as to prevent the lifting of the panels out of the sill slots while not interfering with the obtaining of the desired adjustments of the rollers supporting the panels. Vertically depending screw pins 124 may be inserted in the top rail slideway. The pins 122 and 124 are to be inserted after the respective panels have been positioned and adjusted in the installed frame.

I claim:

1. The combination of a plurality of glass panelled doors having bottom rails, a door sill member having a plurality of integrally formed track formations having the upper ends thereof terminating on substantitally a common plane, rollers mounted on the doors and projecting downwardly below the rails and adapted to ride the sill track formations, weather sealing surfaces disposed between the track formations and disposed substantially in a horizontal plane, said surfaces and the tops of the track formations being disposed in substantially a common plane, said sill member having an auxiliary screen door depressed track formation disposed outwardly in the sill member from the door roller track formations, longitudinal downwardly extending flanges depending from the undersides of the track formations and determining the structural depth of the sill member and a stoop formation integrally formed on the sill member and extending outwardly and downwardly from the said top plane of the sill member.

2. The combination of a plurality of glass door panels having bottom rails, a door sill member of a door frame structure having a plurality of integrally formed track formations, said track formations being bounded by longitudinally extending grooves, flanged rollers mounted on the panel rails and supported to ride the sill track formations, weather sealing surfaces on the sill member disposed between the track formations, said surfaces and the tops of the track formations being disposed in substantially a common plane, longitudinal downwardly extending flanges depending from the undersides of the track formations and determining the structural depth of the sill member, said longitudinally extending grooves having sheared depressions forming openings to the under side of the sill member and a trough like structure extending transversely of the sill member and supported by the downwardly extending flanges of the sill member beneath the groove openings for drawing water from the sill track grooves to the outside of the sill member and shutter members at the discharge ends of the troughs for preventing ingress of wind and rain to the troughs.

3. The combination of a plurality of glass door panels having bottom rails, a door sill member having a plurality of integrally formed track formations, rollers mounted on the panel rails and supported to ride the sill track formations, weather sealing surfaces disposed between the track formations, said surfaces and the tops of the track formations being disposed in substantially a common, horizontal plane, said sill member having longitudinal downwardly extending flanges depending from the track formations comprising supports for the track formations extending longitudinally along the under sides of the track formations, said track formations having drainage openings associated therewith extending to the under side of the sill member, and a transversely disposed drainage trough supported by the depending flanges and disposed beneath the track drainage openings.

4. A sliding glass door sash, a door frame structure in which the sash is slidably mounted, said door frame having top channel formations into which the top portion of the door sash extends, said top portion of the sash having a dovetail groove formed to extend across the top portion of the door sash, weather proofing piling held in said groove with the piling contacting the walls of the top channel formations of the door frame structure and limiting stops on the upper part of the sash of less height than the piling and serving to contact the channel walls thereby to prevent over compacting of the piling.

5. A door frame structure having top frame channel formations, sliding glass door sashes slidingly mounted in the channel formations by extending up into the channel formations, the portions of the sashes extending into the channel formations having grooves formed across the extended top portions of the sashes, weather proofing piling held in said grooves with the piling contacting the walls of the channel formations of the door frame structure and limiting stops on the upper parts of the sashes of less height than the piling to contact the walls of the channel formations thereby to prevent excessive compacting of the piling.

References Cited in the file of this patent

UNITED STATES PATENTS

| | | |
|---|---|---|
| 802,081 | McQueen | Oct. 17, 1905 |
| 2,536,351 | Bureau | Jan. 2, 1951 |
| 2,553,459 | Klein | May 15, 1951 |
| 2,574,496 | Pomeroy et al. | Nov. 13, 1951 |
| 2,575,655 | Clerk | Nov. 20, 1951 |
| 2,668,318 | Le Bon | Feb. 9, 1954 |
| 2,685,110 | Hauck | Aug. 3, 1954 |
| 2,787,034 | Hauck | Apr. 2, 1957 |
| 2,788,097 | Frick | Apr. 9, 1957 |
| 2,835,934 | Franzblau et al. | May 27, 1958 |

FOREIGN PATENTS

| | | |
|---|---|---|
| 326,006 | France | Feb. 7, 1903 |